(12) United States Patent
Weng

(10) Patent No.: US 8,330,386 B2
(45) Date of Patent: Dec. 11, 2012

(54) REMOTE CONTROL AND ADJUSTMENT APPARATUS DISPOSED IN AN ENERGY SAVING LIGHTING APPARATUS AND A CONTROL SYSTEM OF THE SAME

(75) Inventor: Lin-Song Weng, Chu-Pei (TW)

(73) Assignee: Hugewin Electronics Co., Ltd., Jhupei (TW)

( * ) Notice: Subject to any disclaimer, the term of this patent is extended or adjusted under 35 U.S.C. 154(b) by 142 days.

(21) Appl. No.: 12/843,675

(22) Filed: Jul. 26, 2010

(65) Prior Publication Data

US 2011/0309766 A1    Dec. 22, 2011

(30) Foreign Application Priority Data

Jun. 22, 2010  (TW) .............................. 99120329 A

(51) Int. Cl.
*H05B 37/02* (2006.01)
*G05B 19/02* (2006.01)

(52) U.S. Cl. ........................................ 315/287; 315/291

(58) Field of Classification Search .................. 315/291, 315/287, 307, 308
See application file for complete search history.

(56) References Cited

U.S. PATENT DOCUMENTS

| | | | |
|---|---|---|---|
| 6,759,966 B1* | 7/2004 | Weng ............................. | 340/9.1 |
| 7,023,004 B2* | 4/2006 | Ford et al. .................. | 250/495.1 |
| 7,315,036 B2* | 1/2008 | Ford et al. .................. | 250/504 R |
| 2005/0179404 A1* | 8/2005 | Veskovic et al. ............... | 315/291 |
| 2005/0184671 A1* | 8/2005 | Williams et al. ............... | 315/119 |
| 2007/0007898 A1* | 1/2007 | Bruning .......................... | 315/34 |
| 2008/0211427 A1* | 9/2008 | Budde et al. ................... | 315/294 |
| 2009/0284155 A1* | 11/2009 | Reed et al. ....................... | 315/32 |
| 2010/0141153 A1* | 6/2010 | Recker et al. ................. | 315/149 |
| 2010/0327766 A1* | 12/2010 | Recker et al. ................. | 315/291 |
| 2011/0095687 A1* | 4/2011 | Jonsson ......................... | 315/51 |
| 2011/0204778 A1* | 8/2011 | Sadwick et al. ............... | 315/34 |
| 2011/0248643 A1* | 10/2011 | Liu et al. ...................... | 315/291 |

* cited by examiner

*Primary Examiner* — Don Le
(74) *Attorney, Agent, or Firm* — Birch, Stewart, Kolasch & Birch, LLP

(57) ABSTRACT

The present invention provides a remote control and adjustment apparatus disposed in an energy saving lighting apparatus and a control system of the same. The remote control and adjustment apparatus of the invention includes a RF wireless transceiver, a processing module and a power module. The wireless transceiver can receive a first signal from a remote controller. The processing module can receive the first signal from the wireless transceiver, and generate a second signal or generate and send a third signal according to the first signal. Particularly, the second signal includes at least a control parameter, and the processing module can control the energy saving lighting apparatus operating based on the control parameter. Additionally, the power module can provide electric power for the operation of the remote control and adjustment apparatus.

23 Claims, 4 Drawing Sheets

REMOTE CONTROL AND ADJUSTMENT APPARATUS DISPOSED IN AN ENERGY SAVING LIGHTING APPARATUS AND A CONTROL SYSTEM OF THE SAME

FIELD OF THE INVENTION

This invention relates to a remote control and adjustment apparatus and control system for an energy saving lighting apparatus, particularly, this invention relates to a remote control and adjustment apparatus and control system for energy saving lighting apparatus having wireless radio frequency signal transceiver function.

BACKGROUND OF THE INVENTION

In recent years, along with high development in domestic economy, people put more emphasis on life convenience and living quality. Moreover, continuous development in the industrial sector has turned the application of lighting apparatus not just limited to illumination. Due to gradual promotion in living quality and continuous innovation in the design of living environment, to act in accordance with the entire beauty of entire space design, the lighting design has caught the attention from the public, among them, energy saving lamp, as compared to the traditional tungsten lamp, has advantages such as: low power, high luminance, long life-time, energy saving, low malfunction rate, stable lighting, and highly compatible to all kinds of lighting apparatuses, etc., it thus has become the mainstream product in the market.

At the internal side of general energy saving lamp, it mainly includes a small fluorescent tube and a closely attached electronic stabilizer. Through the oscillation loop in the electronic stabilizer, alternating current of certain frequency is generated to light up the fluorescent tube. At this moment, the brightness of energy saving lamp can also be controlled by controlling fluorescent tube in terms of different frequency of pulse, different amplitude of pulse, different phase of pulse and different width of pulse. However, due to custom, most of the current indoor lighting apparatuses need the user to turn it on and off in manual way. Although the user can add timer onto specific lighting apparatus to achieve the purpose of timed on and off, yet the timer is usually not cheap and difficult to be installed on all the lighting apparatuses.

Therefore, when the user leaves home and suddenly "forgetting to turn off the lighting apparatus" comes to the mind, in addition to rushing back to the home, the only way the user can do is to let the lighting apparatus stay on for a whole day until the user comes back to the home at the duty-off hour. Such situation could, in addition to reducing the lifetime of lighting apparatus, also accumulate a large amount of electricity fee, meanwhile, the lighting apparatus could stay in high temperature and get burned out due to long time of stay in the ON status, sometimes, it could even catch fire and result in disaster that can not be remedied.

SUMMARY OF THE INVENTION

Therefore, one of the objectives of this invention is to provide a remote control and lighting apparatus disposed in an energy saving lighting apparatus so as to achieve the objectives of remote light adjustment, transferring signal and responding to remote control in energy saving lighting apparatus; by doing so, the issues such as insufficient remote control distance or no response after remote control as occurred in radio frequency wireless remote control as mentioned in the prior art can then be solved.

According to one real embodiment, the remote control and adjustment apparatus includes wireless radio frequency transceiver module, processing module and power module. Wherein, processing module is connected to wireless radio frequency transceiver module, and power module is connected respectively to wireless radio frequency transceiver module and processing module.

Wireless radio frequency transceiver module can receive first signal sent out by wireless radio frequency remote control device in the external side of energy saving lighting apparatus. Processing module can receive first signal from wireless radio frequency transceiver module, then it generates second signal, third signal, fourth signal, etc. according to first signal. Particularly, second signal includes at least a control parameter, meanwhile, processing module uses second signal to control energy saving lighting apparatus to follow the control parameter for operation. In addition, third signal and fourth signal is different control signal generated by processing module according to the hint from first signal, and it is a control system that can be sent to other energy saving lighting apparatus or can be set up. In addition, power module can supply the power needed for the operation of remote control light adjustment apparatus.

During actual application, the remote control light adjustment apparatus can, based on the first signal, further generate and send out a third signal to another energy saving lighting apparatus. During the actual application, another energy saving lighting apparatus can follow the third signal to generate a fourth signal similar to second signal, the same as second signal, meanwhile, it can follow fourth signal to control itself to follow at least one control parameter for operation. Of course, according to the above mentioned mechanism, first signal (light adjustment signal) can be sent among a plurality of energy saving lighting apparatuses so as to control the operation of a plurality of energy saving lighting apparatuses (For example, light emitting).

During the actual application, the processing module further includes memory unit, processing unit and conversion circuit. Processing unit is connected respectively to the wireless radio frequency transceiver module and the memory unit; conversion circuit is connected to the processing unit. Memory unit can store current identification code, and the light emitting and light adjustment level data as set up last time regarding to the energy saving lighting apparatus itself. Processing unit can receive the first signal from wireless radio frequency transceiver module; the first signal includes target identification code regarding target energy saving lighting apparatus and the hint code for it to transfer the signal. Moreover, processing unit will compare whether the target identification code matches the current identification code, if so, it will follow the first signal to generate second signal, or as mentioned above, it will generate and transfer third signal to another energy saving lighting apparatus. After conversion circuit receives the second signal from the processing unit, it will use the second signal to control the energy saving lighting apparatus to follow the control parameter for operation. That is, conversion circuit will follow second signal to perform light adjustment on energy saving lighting apparatus.

In addition, when the target identification code matches the current identification code, the processing unit can generate confirmation signal, and through the wireless radio frequency transceiver module, the confirmation signal is answered to the wireless radio frequency remote control device.

Yet another objective of the current invention is to provide a control system for remote control light adjustment apparatus to solve the prior art issue.

According to one embodiment, the control system includes the above mentioned radio frequency wireless radio frequency remote control device and remote control light adjustment apparatus. The wireless radio frequency remote control apparatus can generate and send out first signal. The wireless radio frequency transceiver module of the remote control light adjustment apparatus can receive the first signal; furthermore, the processing module of the remote control light adjustment apparatus can follow the first signal to generate second signal, or generate and transfer a third signal to another energy saving lighting apparatus. Second signal contains at least one control parameter so that processing module can use the second signal to control the energy saving lighting apparatus to follow the control parameter for operation. In addition, power module can provide power needed for the operation of remote control light adjustment apparatus.

During actual application, the control system further includes a data processing apparatus and such apparatus further includes a data input output apparatus, and input apparatus can enter remote control command through computer network wire, or people can use fingers to press the buttons to enter commands, such command can be converted into a first signal, and such first signal can be, through remote control module, sent to the above mentioned wireless radio frequency transceiver module. During the practice, the data processing apparatus and wireless radio frequency remote control apparatus can be connected through wireless network or wired network.

To sum up the above mentioned, it is clear that the remote control light adjustment apparatus of this invention can be controlled by wireless radio frequency remote control apparatus to perform light adjustment on energy saving lighting apparatus, meanwhile, it can use radio frequency wave to reply to wireless radio frequency remote control apparatus, in the mean time, it can transfer the control signal of wireless radio frequency remote control apparatus to other remote control and light adjustment energy saving lighting apparatus and/or other remote control to be remotely controlled. Furthermore, the user can operate data processing apparatus to be connected to, through network, network wireless radio frequency remote control apparatus, then through the network wireless radio frequency remote control apparatus, the operation statuses of ON/OFF or light emitting brightness of the energy saving lighting apparatus is controlled, and the issues in the prior art are then effectively solved.

For the advantages and spirit regarding this invention, further understanding can be achieved through the following detailed description and attached drawings of the current invention.

DETAILED DESCRIPTION OF THE INVENTION

This invention provides remote control light adjustment apparatus and its control system for an energy saving lighting apparatus. In the followings, preferred embodiments and real application cases of this invention will be described in details so as to fully describe the features, spirit and advantages of this invention.

Figure 1:
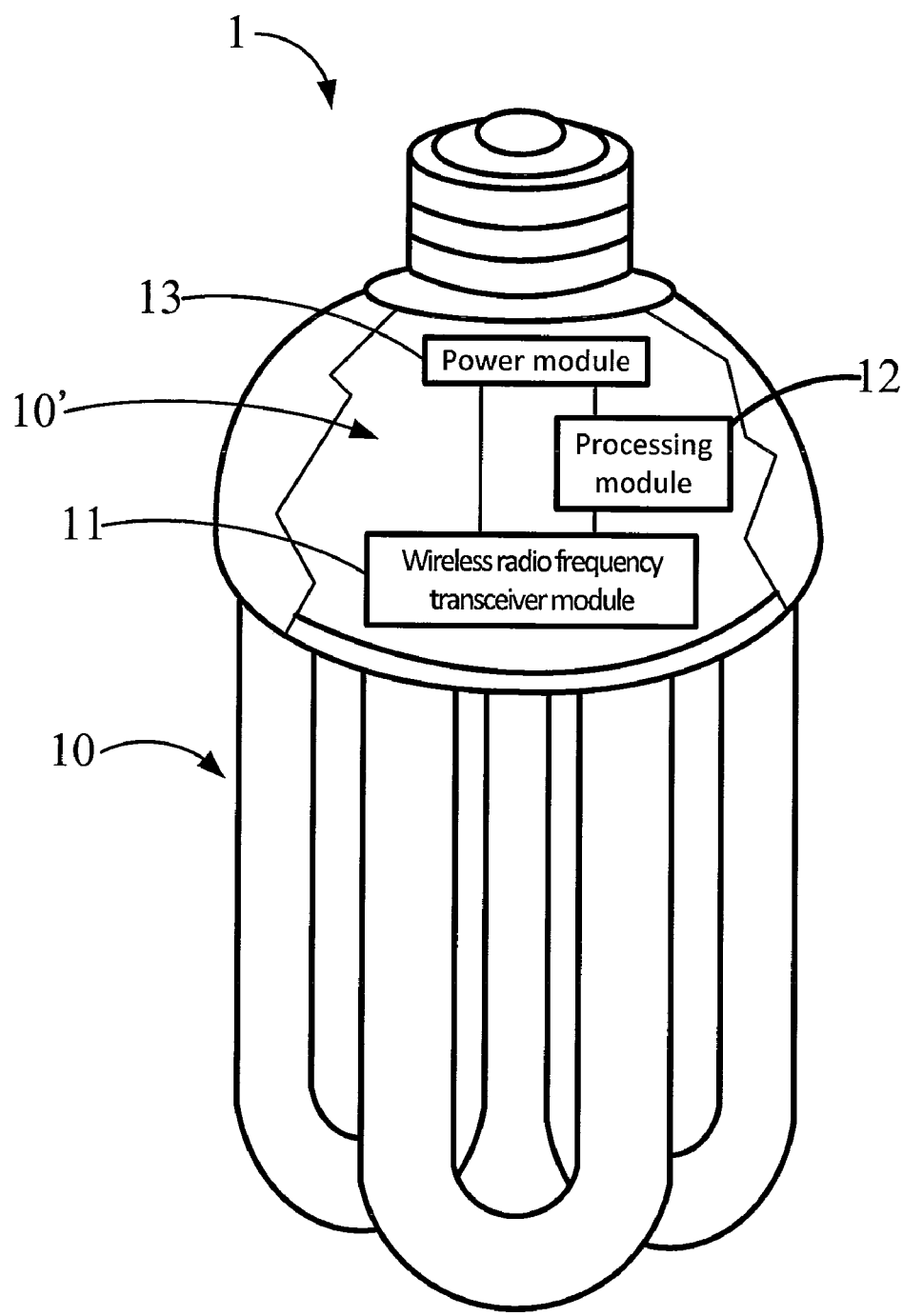
FIG. 1 illustrates energy saving lighting apparatus including remote control light adjustment apparatus according to one embodiment of the current invention.
Figure 2:
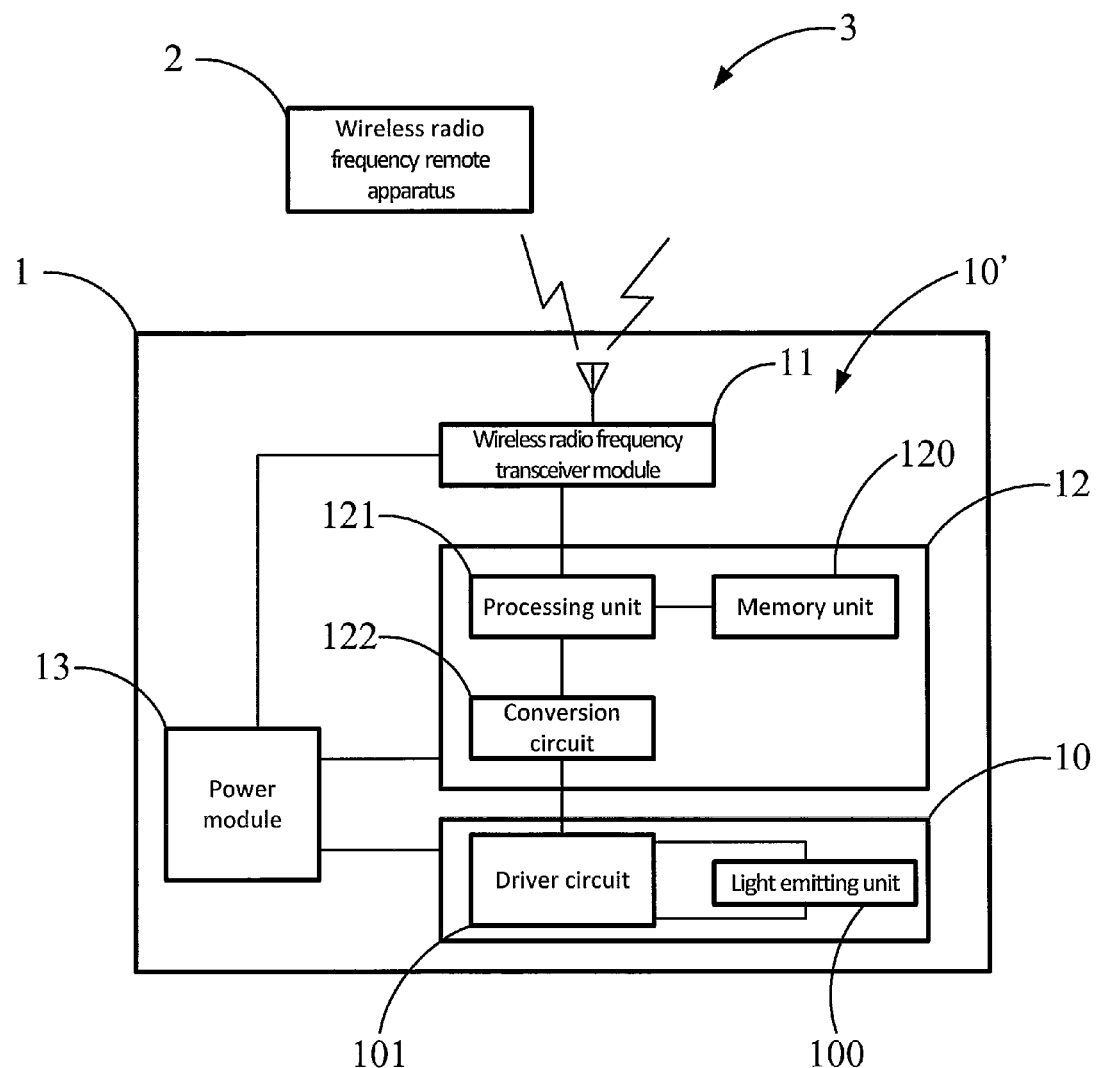
FIG. 2 illustrates the functional block diagram of wireless control system according to one embodiment of the current invention.

Please refer to FIG. 1 and FIG. 2 together. FIG. 1 is an illustration of one of the embodiments of the current invention, including energy saving lighting apparatus of remote control light adjustment apparatus; FIG. 2 is an illustration of another embodiment of the current invention, that is, the functional block diagram of control system.

As shown in FIG. 2, in this embodiment, control system 3 of this invention includes energy saving lighting apparatus 1 and wireless radio frequency remote apparatus 2. Energy saving lighting apparatus 1 includes light emitting module 10 and remote control light adjustment apparatus 10' remote control light adjustment apparatus 10' further includes wireless radio frequency transceiver module 11, processing module 12 and power module 13. In this embodiment, light emitting module 10 further includes light emitting unit 100 and driver circuit 101; and processing module 12 further includes memory unit 120, processing unit 121 and conversion circuit 122.

Furthermore, processing unit 121 of processing module 12 is connected respectively to wireless radio frequency transceiver module 11 and memory unit 120; conversion circuit 122 is connected respectively to the driver circuit 101 of processing unit 121 and light emitting module 10. In addition, the driver circuit 101 of light emitting module 10 is connected respectively to conversion circuit 122 and light emitting unit 100; power module 13 is connected respectively to light emitting module 10, wireless radio frequency transceiver module 11 and processing module 12.

Wireless radio frequency transceiver module 11 can receive the first signal sent out from wireless radio frequency remote control apparatus 2. In real practice, first signal can include a target identification code regarding a target energy saving lighting apparatus. In real application, wireless radio frequency transceiver module 11 can be RF wireless radio frequency transceiver module, or other suitable wireless radio frequency transceiver module.

Memory unit 120 of processing module 12 stores current identification code and other information regarding to the energy saving lighting apparatus 1 itself, for example, but not limited to, the previously setup light emitting and light adjustment level. In real application, memory unit 120 can be flash memory, memory within a single chip, memory within system-on-a-chip (SOC) or other suitable memory unit. Processing unit 121 of processing module 12 receives the first signal from wireless radio frequency transceiver module 11, and compare whether the target identification code matches the current identification code of memory unit 120. If so, processing unit 121 will follow first signal to generate second signal.

For example, suppose there is first energy saving lighting apparatus (current identification code is E001), second energy saving lighting apparatus (current identification code is E002) and third energy saving lighting apparatus (current identification code is E003), when wireless radio frequency remote control apparatus 2 is to control the second energy saving lighting apparatus, the first signal sent out includes target identification code E002 regarding to second energy saving lighting apparatus. At this moment, when the first energy saving lighting apparatus or the third energy saving lighting apparatus receives first signal, since it does not match its own current identification code E001 and E003, second signal is thus always not to be generated. Only when second energy saving lighting apparatus receives first signal, the second signal is generated. However, in real application, even first signal does not match its own current identification code E001, E003, first energy saving lighting apparatus or third energy saving lighting apparatus can still convert the first signal into third signal that includes identification code E002, and send it to second energy saving lighting apparatus so that second energy saving lighting apparatus can follow third signal to generate the above mentioned second signal.

In real application, second signal includes at least one control parameter, for example, but not limited to, ON/OFF the parameter and brightness parameter, etc. In addition, conversion circuit 122 can receive the second signal from the processing unit 121 and use the second signal to control the driver circuit 101 in light emitting 10 so that driver circuit 101 will follow the control parameter in second signal to adjust the voltage, current, phase or power of the pulse signal supplied by power module 13 to light emitting unit 100 to make light emitting unit 100 operate by following the control parameter.

For example, when ON/OFF parameter of second signal is "OFF", conversion circuit 122 will use second signal to control driver circuit 101 so that driver circuit 101 will control power module 13 not to supply power to light emitting unit 100 and to turn off light emitting unit 100. Take another example, when the brightness parameter in second signal is "200 lumen", conversion circuit 122 will convert second signal into signal of different pulse width and frequency so as to control driver circuit 101 to control the strength and phase of voltage and current of the pulse signal that power module 13 supplies to light emitting unit 100, and light emitting unit 100 then can emit light of 200 lumens.

In real practice, when target identification code matches the current identification code of memory unit 120, processing unit 121 will further generate confirmation signal, and through wireless radio frequency transceiver module 11, the confirmation signal is replied to wireless radio frequency remote control apparatus 2. In addition, in real practice, when target identification code matches the current identification code of memory unit 120 and there is command to call for it to transfer the signal, then wireless radio frequency transceiver module 11 can, after receiving this transferring command, transfer the first signal to the external side. In other words, wireless radio frequency transceiver module 11 can transfer first signal to other remote control light adjustment apparatus or energy saving lighting apparatus so that wireless radio frequency remote control apparatus 2 can control a plurality of remote control light adjustment apparatuses or energy saving lighting apparatuses located at different locations.

Power module 13 can convert alternating current into high voltage direct current so as to drive light emitting unit 100, meanwhile, power module 13 can also convert alternating current into low voltage direct current so as to provide the needed current for the operation of wireless radio frequency transceiver module 11 and processing module 12. In real application, the voltage of high voltage direct current can be in the range from 300 to 600 volts, for example, 300 volts, 350 volts, 400 volts, 401 volts, 500 volts, 550 volts, 600 volts, but not limited to these voltages. In addition, in real application, the voltage of low voltage direct current can be in the range from 2 to 25 volts, for example, 2 volts, 3 volts, 5 volts, 15 volts, 25 volts, but not limited to these voltages.

In real application, feedback circuit can be installed between light emitting module 10 and conversion circuit 122 to detect when there is change in the output high voltage, how the lowest brightness of the light emitted by light emitting unit is controlled. In real application, feedback circuit can also be installed between processing unit 121 and conversion circuit 122 to control the abnormal condition when there is no light emitting unit or when light emitting unit is damaged.

In real application, light emitting unit 100 can be, but not limited to, for example, energy saving lamp, energy saving tube, PL tube, PLC tube, high-intensity discharge (HID) tube, etc.

Figure 3A:
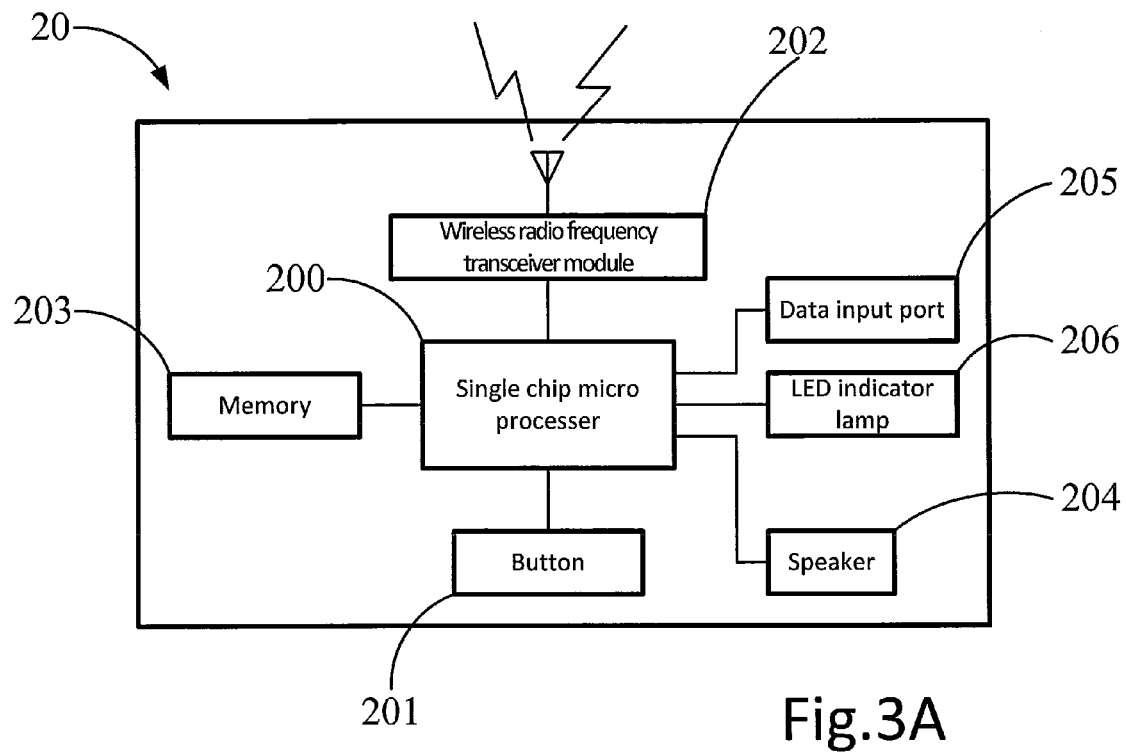
FIG. 3A illustrates the functional block diagram of button type wireless remote controller according to one embodiment of the current invention.
Figure 3B:
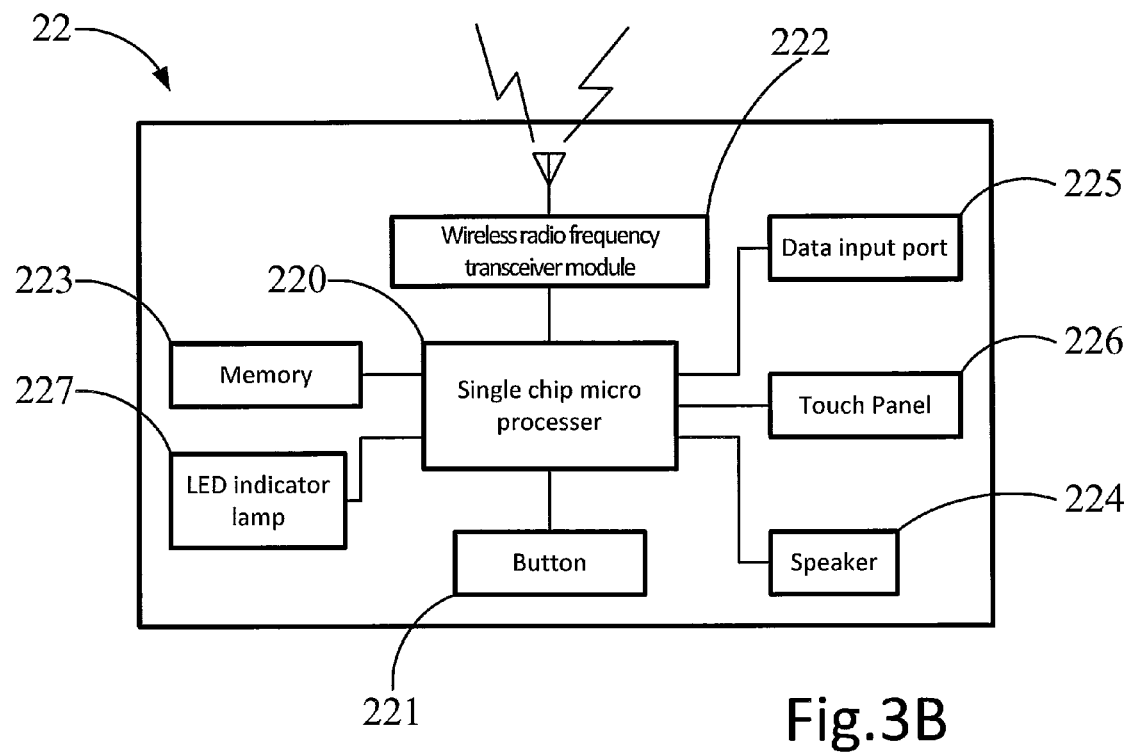
FIG. 3B illustrates the functional block diagram of touch panel type remote controller according to one embodiment of the current invention.

According to one embodiment, wireless radio frequency remote apparatus 2 can be button type remote controller, or touch panel type remote controller. Please refer respectively to FIG. 3A and FIG. 3B, FIG. 3A illustrates the functional block diagram of button type remote controller 20 according to one embodiment of the current invention; FIG. 3B illustrates the functional block diagram of touch panel type remote controller 22 according to one embodiment of the current invention.

As shown in FIG. 3A, button type remote controller 20 includes single chip microprocessor 200 and button 201 connected to single chip microprocessor 200, wireless radio frequency transceiver module 202, memory 203, speaker 204, LED indicator lamp 206 and data input port 205. Button 201 can be operated by the user to input control command, and single chip controller will generate the above mentioned first signal according to input command, then the first signal is sent through wireless radio frequency transceiver module 202, memory 203 can store several default control commands and corresponding first signals so that single chip microprocessor 200 (or SOC) can follow directly control command to read the corresponding first signal and output.

As shown in FIG. 3B, touch panel type remote controller 22 includes single chip microprocessor 220 and button 221 connected to single chip microprocessor 220, wireless radio frequency transceiver module 222, memory 223, speaker 224, data input port 225, touch panel 226 and LED indicator lamp 227. Wherein, the user can, through button 221 or touch panel 226, input the control command, and touch panel 226 can display corresponding information to be referred by the user, meanwhile, LED indicator lamp 227 can also use different light emitting modes to represent different information.

Figure 4:
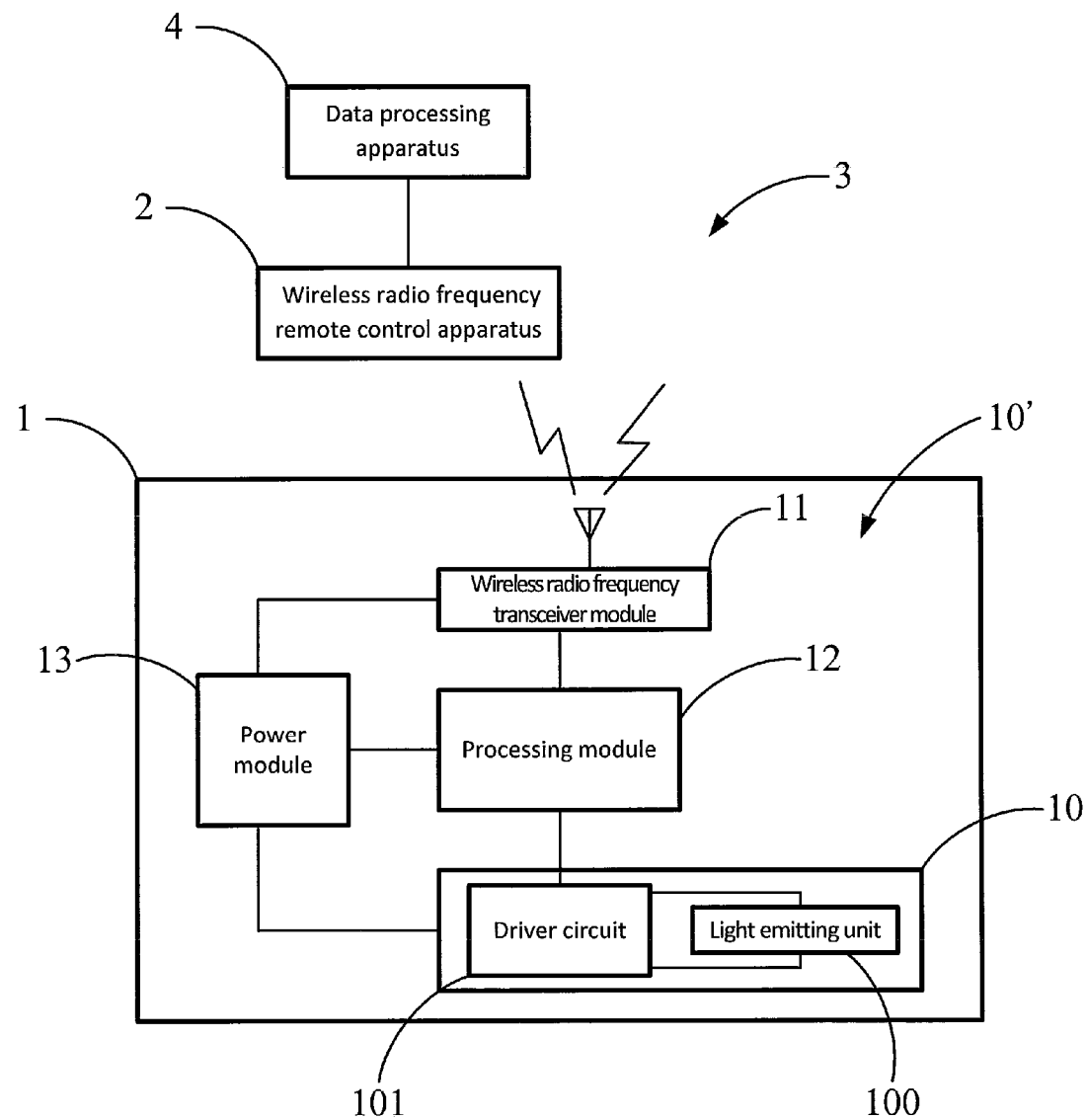
FIG. 4 illustrates the functional block diagram of control system according to one embodiment of the current invention.

Please refer again to FIG. 4, which illustrates the functional block diagram of control system according to another embodiment of the present invention.

As shown in the figure, in the present embodiment, the control system 3 of the current invention, in addition to the above mentioned wireless radio frequency remote control apparatus 2 and energy saving lighting apparatus 1, further includes data processing apparatus 4. Data processing apparatus 4 is connected to wireless radio frequency remote control apparatus 2 to receive the command entered by the user and send the command to wireless radio frequency remote control apparatus 2 so that wireless radio frequency remote control apparatus 2 can follow the command to generate first signal. In real application, data processing apparatus 4 can be the telephone remote home electrical appliance control apparatus manufactured using mobile SIM card, it can also be computer, or network HUB, or network switching board (SWITCT), or other suitable data processing apparatus. In real application, data processing apparatus 4 can, through wired or wireless computer network or telephone network to be connected to wireless radio frequency remote control apparatus 2 or a computer wireless router. In addition, in this real embodiment, the device and function included in wireless radio frequency remote control apparatus 2 and energy saving lighting apparatus 1 are the same as the above mentioned and will not be described again here.

Please note that in this embodiment, processing module 12 can be implemented as SOC, hence, the above mentioned processing unit, memory unit and conversion circuit can all be integrated in it. The data processing apparatus 4 and the wireless radio frequency remote control apparatus 2 can be integrated in a computer wireless router or network switching board (SWITCT).

As mentioned above, remote control light adjustment apparatus of this invention can be controlled by wireless radio frequency remote control apparatus to control energy saving lighting apparatus to emit light and to adjust its brightness, meanwhile, it can reply wireless radio frequency remote control apparatus, it can also transfer the control signal of wireless radio frequency remote control apparatus to other energy saving lighting apparatus or remote control light adjustment apparatus. Furthermore, the user can operate data processing apparatus to be connected to wireless radio frequency remote control apparatus through all kinds of computer network and telephone network, then through wireless radio frequency remote control apparatus, it can control remote control light adjustment apparatus so that remote control light adjustment apparatus can control the operation statuses such as ON/OFF or light emitting brightness of energy saving lighting apparatus, and the issues in the prior art can be effectively solved.

Although the present invention is disclosed through a better embodiment as above, yet it is not used to limit the present invention, anyone that is familiar with this art, without deviating the spirit and scope of the present invention, can make any kinds of change, revision and finishing; therefore, the protection scope of the present invention should be based on the scope as defined by the following attached "what is claimed".

What is claimed is:

1. A remote control light adjustment apparatus disposed in an energy saving lighting apparatus to control the light emitting action of the energy saving lighting apparatus, and the remote control light adjustment apparatus includes:
   a wireless radio frequency transceiver module is used to receive a first signal sent out from a wireless radio frequency remote control apparatus;
   a processing module is connected to the wireless radio frequency transceiver module so as to receive the first signal, then based on the first signal, a second signal is generated, and the second signal includes at least one control parameter, and the processing module uses the second signal to control the energy saving lighting apparatus to follow the at least one control parameter to operate; and
   a power module, connected respectively to the wireless radio frequency transceiver module and the processing module, the power module receiving an AC power, converting the AC power to a DC power, and supplying the DC power needed for the operation of the remote control light adjustment apparatus.

2. The remote control light adjustment apparatus of claim 1, wherein the energy saving lighting apparatus includes:
   a light emitting unit; and
   a driver circuit, connected respectively to the processing module, the light emitting unit and the power module, and the driver circuit is controlled by the processing module and follow the control parameter to control the voltage, current, phase or power of the pulse signal sent to the light emitting unit by the power module.

3. The remote control light adjustment apparatus of claim 2, wherein the light emitting unit is an energy saving lamp, PL lamp, PLC lamp, or a high-intensity discharge (HID) tube.

4. The remote control light adjustment apparatus of claim 1, wherein the processing module further includes:
   a memory unit, to store a current identification code regarding to the energy saving lighting apparatus itself;
   a processing unit, connected respectively to the wireless radio frequency transceiver module and the memory unit to receive the first signal from the wireless radio frequency transceiver module, and the first signal includes a target identification code regarding to a target energy saving lighting apparatus, and the processing unit will compare whether the target identification code matches the current identification code, if so, it will follow the first signal to generate the second signal or to generate and transfer a third signal to another energy saving lighting apparatus; and
   a conversion circuit, connected to the processing unit to receive the second signal from the processing unit, it then uses the second signal to control the energy saving lighting apparatus to operate according to the control parameter.

5. The remote control light adjustment apparatus of claim 4, wherein when the target identification code matches the current identification code, the processing unit will further generate a confirmation signal, and through the wireless radio frequency transceiver module, the confirmation signal will be replied to the wireless radio frequency remote control apparatus.

6. The remote control light adjustment apparatus of claim 1, wherein the power module converts an alternating current into a high voltage current to drive the energy saving lighting apparatus, and the power module converts the alternating current into a low voltage current for the operation need of the wireless radio frequency transceiver module and the processing module.

7. The remote control light adjustment apparatus of claim 1, wherein the at least one control parameter includes an ON/OFF parameter and a brightness parameter.

8. The remote control light adjustment apparatus of claim 1, wherein the wireless radio frequency remote control apparatus is a wireless radio frequency remote control apparatus converted from wired one.

9. The remote control light adjustment apparatus of claim 8, wherein the wireless radio frequency remote control apparatus is a wireless radio frequency remote control apparatus or a wireless data transceiver.

10. A control system for energy saving lighting apparatus remote control light adjustment apparatus, comprising:
    a wireless radio frequency remote control apparatus is used to send a first signal; and
    a remote control light adjustment apparatus; remote control light adjustment apparatus is disposed in the energy saving lighting apparatus to control the energy saving lighting apparatus for light emitting, and the remote control light adjustment apparatus includes;
    a wireless radio frequency transceiver module is used to receive the first signal sent out from the wireless radio frequency remote control apparatus;
    a processing module, is connected to the wireless radio frequency transceiver module to receive the signal, then based on the first signal, a second signal is generated or a third signal is generated and transferred to another energy saving lighting apparatus, and the second signal includes at least one control parameter, and the processing module uses the second signal to control the energy saving lighting apparatus to follow the at least a control parameter for operation; and a power module, connected respectively to the wireless radio frequency transceiver module and the processing module to supply the power needed for the operation of the remote control light adjustment apparatus.

11. The control system of claim 10, further comprising:

a data processing apparatus, connected to the wireless radio frequency remote control apparatus to receive a command enter by the user and sent the command to the wireless radio frequency remote control apparatus so that the wireless radio frequency remote control apparatus will follow the command to generate the first signal.

12. The control system of claim 11, wherein the data processing apparatus is a telephone remote home electrical appliance remote control apparatus manufactured by a mobile phone SIM card, a computer network apparatus, a network HUB or a network switching board (SWITCT).

13. The control system of claim 10, wherein the energy saving lighting apparatus includes:

a light emitting unit; and a driver circuit, connected respectively to the processing module, the light emitting unit and the power module, and the driver circuit is controlled by the processing module and follow the control parameter to control the voltage, current, phase or power of a pulse signal supplied by the power module to the light emitting unit.

14. The control system of claim 13, wherein the light emitting unit is an energy-saving lamp, PL lamp, PLC lamp, or a high-intensity discharge (HID) tube.

15. The control system of claim 10, wherein the wireless radio frequency transceiver module further transfers the first signal to the external side.

16. The control system of claim 10, wherein the processing module further includes:

a memory unit, to store a current identification code of remote control light adjustment apparatus for the energy saving lighting apparatus itself;

a processing unit, connected respectively to the wireless radio frequency transceiver module and the memory unit so as to receive the first signal from the wireless radio frequency transceiver module, and the first signal includes a target identification code regarding to an energy saving lighting apparatus, and the processing unit will compare whether the target identification code matches the current identification code, if so, it will follow the first signal to generate the second signal remote control light adjustment apparatus; and a conversion circuit, connected to the processing unit to receive the second signal from the processing unit and to use the second signal to control the energy saving lighting apparatus to follow the control parameter to operate.

17. The control system of claim 16, wherein when the target identification code matches the current identification code, the processing unit will further generate a confirmation signal, and through the wireless radio frequency transceiver module, the confirmation signal is replied to the wireless radio frequency remote control apparatus.

18. The control system of claim 10, wherein the processing module is implemented as a SOC, and the processing unit, the memory unit and the conversion circuit, are all integrated into the SOC.

19. The control system of claim 10, wherein the processing module executes the data processing of the computer network and control light adjustment.

20. The control system of claim 10, wherein the power module converts an alternating current into a high voltage current so as to drive the energy saving lighting apparatus, and the power module converts the alternating current into a low voltage current to be provided as operation need for the wireless radio frequency transceiver module and the processing module.

21. The control system of claim 10, wherein the at least one control parameter includes an ON/OFF parameter and a brightness parameter.

22. The control system of claim 10, wherein the wireless radio frequency remote control apparatus is a wireless radio frequency remote control apparatus converted from wired one or a wireless radio frequency remote control apparatus.

23. A remote control light adjustment apparatus disposed in an energy saving lighting apparatus to control the light emitting action of the energy saving lighting apparatus, and the remote control light adjustment apparatus includes:

a wireless radio frequency transceiver module is used to receive a first signal sent out from a wireless radio frequency remote control apparatus;

a processing module is connected to the wireless radio frequency transceiver module so as to receive the first signal, then based on the first signal, a second signal is generated, and the second signal includes at least one control parameter, and the processing module uses the second signal to control the energy saving lighting apparatus to follow the at least one control parameter to operate; and a power module, connected respectively to the wireless radio frequency transceiver module and the processing module to supply the power needed for the operation of the remote control light adjustment apparatus, wherein further according to the first signal, a third signal is generated and transferred to another energy saving lighting apparatus.

* * * * *

UNITED STATES PATENT AND TRADEMARK OFFICE
CERTIFICATE OF CORRECTION

PATENT NO. : 8,330,386 B2  
APPLICATION NO. : 12/843675  
DATED : December 11, 2012  
INVENTOR(S) : Lin-Song Weng It is certified that error appears in the above-identified patent and that said Letters Patent is hereby corrected as shown below:

ON THE TITLE PAGE:

At item (73), Assignee, change:

"(73) Assignee: Hugewin Electronics Co., Ltd., Jhupei (TW)"

to: --(73) Assignees: Hugewin Electronics Co., Ltd., Jhupei (TW); Lin-Song Weng, Jhupei (TW)--.

Signed and Sealed this  
Seventeenth Day of June, 2014

Michelle K. Lee  
*Deputy Director of the United States Patent and Trademark Office*